United States Patent [19]
Lahti et al.

[11] Patent Number: 4,993,663
[45] Date of Patent: Feb. 19, 1991

[54] HYBRID LAMINAR FLOW NACELLE

[75] Inventors: Daniel J. Lahti; David E. Yates, both of Cincinnati; Parmanand Mungur, West Chester; Norbert O. Stockman, Batavia, all of Ohio

[73] Assignee: General Electric Company, Cincinnati, Ohio

[21] Appl. No.: 359,556

[22] Filed: Jun. 1, 1989

[51] Int. Cl.$^5$ .................................................. B64D 33/02
[52] U.S. Cl. ................................. 244/53 B; 249/53 R; 249/130; 249/208; 249/209
[58] Field of Search ............... 244/53 B, 53 R, 130, 244/208, 209; 60/226.1

[56] References Cited

U.S. PATENT DOCUMENTS

| 2,751,168 | 6/1956 | Stalker | 244/15 |
| 2,892,582 | 6/1959 | O'Rourke | 417/179 |
| 3,410,510 | 11/1968 | Papst | 244/130 |
| 3,765,623 | 10/1973 | Donelson et al. | 244/53 B |
| 3,951,360 | 4/1976 | Anxionnaz | 244/209 |
| 4,154,256 | 5/1979 | Miller | 137/15.1 |
| 4,410,150 | 10/1983 | Lahti | 244/53 R |
| 4,449,681 | 5/1984 | Gratzek et al. | 244/130 |
| 4,449,683 | 5/1984 | Gratzek et al. | 244/130 |
| 4,466,587 | 8/1984 | Dusa et al. | 244/121 |
| 4,533,095 | 8/1985 | Yates | 244/23 D |
| 4,664,345 | 5/1987 | Lurz | 244/209 |
| 4,722,357 | 2/1988 | Wynosky | 137/15.1 |
| 4,749,150 | 6/1988 | Rose et al. | 244/53 B |
| 4,799,633 | 1/1989 | Lahti et al. | 244/130 |
| 4,813,631 | 3/1989 | Gratzer | 244/35 R |
| 4,865,268 | 9/1989 | Tracksdorf | 244/53 B |

OTHER PUBLICATIONS

NASA Contractor Report 165930 "Hybrid Laminar Flow Control Study Final Technical Report", Oct. 1982, pp. 1, 3, 29, 30, 32, 89, 94, 95, and 115.
AIAA-84-1399, "Analytical Study of Suction Boundary Layer Control for Subsonic V/Stol Inlets"; pp. 1-10.

Primary Examiner—Charles T. Jordan
Assistant Examiner—Rochelle Lieberman
Attorney, Agent, or Firm—Jerome C. Squillaro

[57] ABSTRACT

A hybrid laminar flow nacelle for housing an engine of an aircraft includes an outer annular cowl having a leading lip and radially spaced and axially extending annular outer and inner forward surface portions which merge at the leading lip. The nacelle incorporates a suction bleed system between the surfaces and a tailored outer surface geometry shape for producing reduced friction drag laminar flow over the outer cowl at cruise operation of the aircraft and producing separation-free flow over the inner surface of the cowl at off-cruise operation of the aircraft.

22 Claims, 3 Drawing Sheets

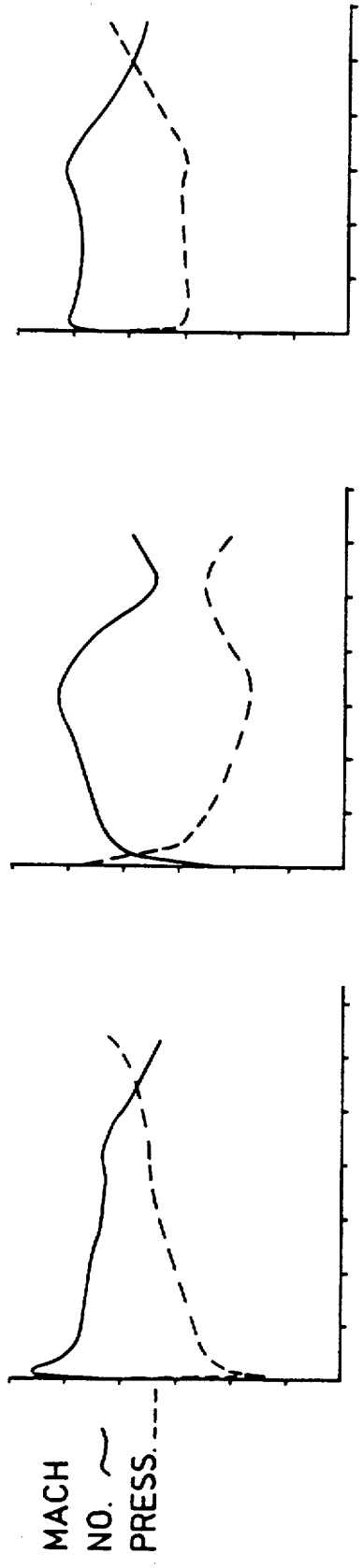
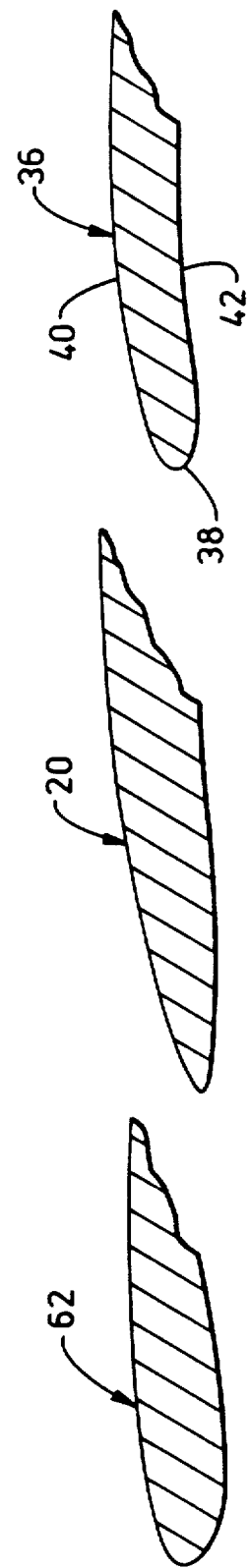

HYBRID LAMINAR FLOW NACELLE

BACKGROUND OF THE INVENTION

The present invention relates generally to a nacelle for housing an aircraft engine and, more particularly, is concerned with a hybrid laminar flow nacelle effective for producing low friction drag, laminar flow at cruise operation and separation-free flow at off-cruise (takeoff or low speed) operation of an aircraft.

2. Description of the Prior Art

In a subsonic aircraft having an externally mounted engine, for example, a gas turbine engine mounted below a wing by a pylon, aerodynamic drag due to freestream airflow over the nacelle of the engine can typically represent approximately 4% of the total engine thrust output Any reduction in this aerodynamic drag can result in a significant saving in the amount of fuel consumed Thus, a desired function of an engine nacelle is to provide a lightweight housing for the aircraft engine which produces relatively low aerodynamic drag.

The aerodynamic drag due to a nacelle is determined by the pressure distribution and a dimensionless friction coefficient $C_f$ over the outer surface of the nacelle over which the freestream air flows during aircraft flight Reduced aerodynamic drag exists where the surface pressure distribution promotes a laminar boundary layer over the nacelle outer surface without any boundary layer separation thereof The friction coefficient $C_f$, and thus aerodynamic drag, have reduced values when a laminar boundary layer exists Where the boundary layer along the nacelle outer surface transitions from laminar to turbulent, the friction coefficient $C_f$, and thus aerodynamic drag, have increased values. Accordingly, it is desirable to provide a nacelle which promotes a surface pressure distribution effective for increasing the extent of laminar boundary layer flow, reducing the extent of turbulent flow and avoiding boundary layer separation.

Previous experience has demonstrated that a properly designed geometry of the outer surface of the nacelle can provide a favorable pressure gradient over an extended region of the nacelle, thus delaying the transition from laminar to turbulent flow. The result is a nacelle design with a lower friction or aerodynamic drag and a consequent reduction in fuel burn of 1.0 to 1.5% during cruise operation An example of such nacelle design is the natural laminar flow nacelle (NLFN) disclosed in D. J. Lahti et al U.S. Pat. No. 4,799,633, and assigned to the assignee of the present invention. The NLFN can result in a reduction of aerodynamic drag at cruise operation of the aircraft of approximately 50% when compared to prior art nacelles.

However, the NLFN with its emphasis on cruise performance has a relatively sharp-lipped leading edge (as compared to a blunt-lipped leading edge of a conventional nacelle) that is inadequate for off-cruise (takeoff or low speed, high angle-of-attack) operation of the aircraft Furthermore, during cruise operation of the aircraft, the NLFN may incur incipient spillage drag and wave drag sooner than the conventional nacelle (that is, at higher mass flow ratios and lower freestream Mach number respectively).

One conventional solution proposed for improving low speed operation of the NLFN by maintaining and extending laminar flow is variable geometry or leading edge systems such as flaps or translating slats, as recognized in the above-cited patent (see column 8, lines 49-55) While these appear to be viable solutions, the weight and mechanical complexity of such systems may cancel the benefits of the cruise drag reduction attributed to laminar flow produced by the NLFN design. In addition, these solutions require careful manufacturing to avoid steps and/or gaps in the external contour of the NLFN, when the system is retracted for high speed operation, that could result in premature transition to turbulent flow independent of the pressure gradient or distribution.

Another conventional solution proposed for maintaining and extending laminar flow on wings and nacelles has involved the use of active control devices, as also recognized in the above-cited patent (see column 2, lines 9-25). An active control device requires an auxiliary source of energy to cooperate with the surface for energizing or removing the boundary layer for maintaining laminar flow and preventing boundary layer separation. For example, boundary layer suction or blowing slots or holes disposed in the surface to be controlled are known in the art. The slot is connected to a pump by internal ducting and is effective for reducing or preventing turbulent flow, and thereby maintaining laminar boundary layer flow. Further, boundary layer bleed has been demonstrated successfully in maintaining laminar flow on airfoils (see NASA Contractor Report 165930 dated October 1982 entitled "Hybrid Laminar Flow Control Study-Final Report"). Also, boundary layer bleed has been demonstrated theoretically to be successful in maintaining attached flow on inlet lips at low speed, high angle-of-attack conditions (see AIAA-84-1399 dated June 1984 entitled "Analytical Study of Suction Boundary Layer Control for Subsonic V/Stol Inlets") However, the additional weight and energy required to power active control devices typically offsets advantages derived from the reduced aerodynamic drag.

For high speed operation, the NLFN is designed to a specific operating point, or mass flow ratio (MFR), to provide the favorable pressure gradient necessary to delay transition to turbulent flow. Decreasing the MFR below the design value can lead initially to premature transition to turbulent flow, thus losing the laminar flow drag advantage, and eventually to earlier spillage drag than a conventional nacelle. Also, since a relatively high Mach number near the maximum nacelle diameter is required to keep the boundary layer laminar, wave drag will become a problem at a lower freestream Mach number than for a conventional nacelle.

Despite the significant advantages and attainments attributed to the NLFN, it still represents less than an optimal design for producing low friction drag, laminar flow at cruise and separation-free flow at off-cruise aircraft operation. However, the conventional solutions referred to above do not unequivocally suggest which way one skilled in the art should proceed toward achievement of a more optimal design. Consequently, a need still remains for an alternative nacelle design more nearly approaching optimum performance.

SUMMARY OF THE INVENTION

The present invention provides a hybrid laminar flow nacelle (HLFN) designed to satisfy the aforementioned needs. The HLFN of the present invention is effective for producing low friction drag, laminar flow at cruise and separation-free flow at off-cruise (takeoff or low speed) operation of an aircraft. The HLFN design of the present invention provides a compromise nacelle which solves both the low-speed and high-speed problems described above. The HLFN is one that does not quite produce natural laminar flow on the external or outer surface at cruise as does the above-cited NLFN and one that passively does not quite satisfy the low speed requirements as does the conventional blunt-lipped nacelle.

However, separation-free flow at off-cruise and low aerodynamic drag laminar flow at cruise operation of the aircraft are achieved in the HLFN by the combined effect of tailored geometry shaping of the nacelle outer surface and use of active control systems providing boundary layer bleed via air suction elements, such as porous walls, perforations or slots. The geometry shape of the leading or forward lip of the HLFN is blunter than the NLFN but sharper than the conventional nacelle. Compared to the conventional blunt-lipped nacelle which produces turbulent flow at cruise operation of the aircraft and compared to the sharp-lipped NFLN which produces turbulent flow and separation at off-cruise operation of the aircraft, the round-lipped HLFN and boundarY layer bleed through the outer or external surface of the HLFN produce laminar flow at cruise operation of the aircraft and the round-lipped HLFN and boundary layer bleed through the inner or internal lip of the HLFN produce separation-free flow at off-cruise (low speed, high angle-of-attack) operation of the aircraft Accordingly, the present invention is directed to a hybrid laminar flow nacelle for housing an engine of an aircraft. The HLFN comprises: (a) an outer annular cowl having a leading lip and radially spaced and axially extending annular outer and inner forward surface portions which merge at the leading lip; and (b) a suction bleed system including a plurality of air suction elements defined in the outer and inner forward surface portions axially downstream from the leading lip in the direction of airflow, suction generating means, and a plurality of ducts interconnecting the air suction elements and suction generating means in flow communication. Further, the outer forward surface portion of the outer cowl has a geometry shape tailored to produce a substantially uniform pressure in a boundary layer airflow along the outer surface portion. Also, the suction generating means is operable for applying suction selectively to the air suction elements to cause bleed of the boundary layer airflow through the air suction elements at the outer surface of the cowl for augmenting reduced friction drag laminar flow over the cowl at cruise operation of the aircraft and to cause bleed of the boundary layer airflow through the air suction elements at the inner surface of the cowl for preventing separation flow over the inner surface of the cowl at off-cruise operation of the aircraft.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 5A-5C are fragmentary longitudinal axial sectional views of upper forward portions of the conventional nacelle, the NLFN and the HLFN, respectively.

FIG. 6A-6C are graphs of the Mach number and pressure gradient or distribution over the upper forward portions of the nacelles of FIGS. 5A-5C.

DETAILED DESCRIPTION OF THE INVENTION

Figure 1:
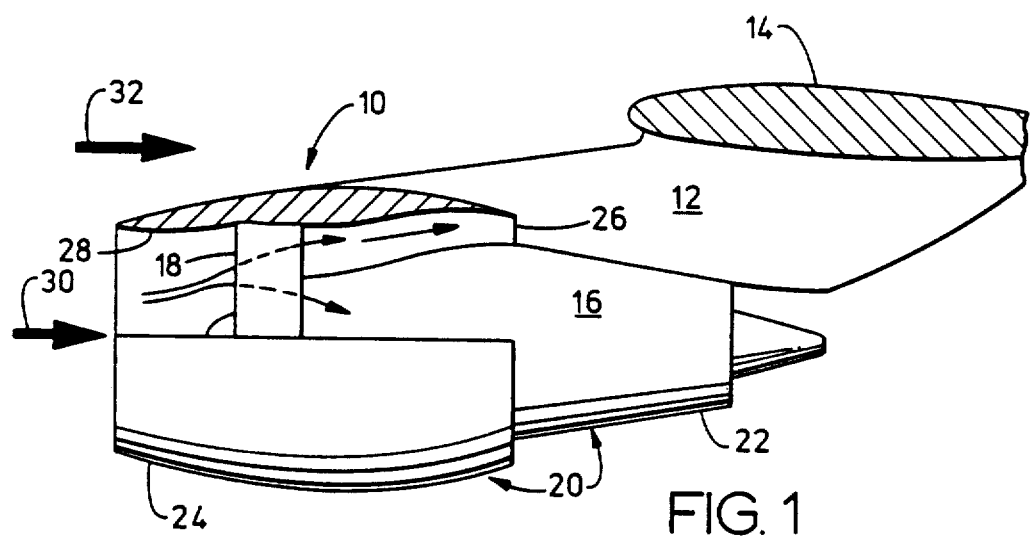
FIG. 1 is a side elevational view, with portions broken away and cross-sectioned, of a turbofan engine mounted to a wing of an aircraft by a pylon and incorporating a prior art nacelle.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, a conventional gas turbofan engine 10 is shown mounted by an aerodynamically shaped pylon 12 below and forwardly of a wing 14 of an aircraft (not shown). An aircraft with the engine and wing arrangement shown in FIG. 1 is designed for subsonic operation.

The turbofan engine 10 includes a core engine 16 which produces thrust to propel the aircraft and a fan assembly 18 driven by the core engine 16 to produce additional thrust. Housing the engine 10 is an annular nacelle 20, such as the NLFN of the above-cited patent, which includes an inner, or core, cowl 22 surrounding the core engine 16 and an outer, or fan, cowl 24 surrounding the fan assembly 18. The outer cowl 24 of the NLFN 20 also surrounds and is spaced from a forward portion of the inner cowl 22 thereof for defining an annular fan discharge nozzle 26. The outer cowl 24 includes an inlet throat 28 for receiving the engine airflow portion 30 of a freestream airflow 32.

During aircraft operation, the engine airflow 30 is accelerated by the fan assembly 18 and is discharged from the fan nozzle 26 over the inner cowl 22 of the NLFN 20 for generating thrus. The freestream air flow 32 flows downstream over the outer cowl 24 of the NLFN 20 and interacts with or scrubs the outer cowl 24 and produces aerodynamic drag, a significant portion of which is frictional drag acting in a direction opposite to that of the moving aircraft.

A primary purpose of the present invention is to provide modifications to the outer cowl 24 of the NLFN 20 that are effective for reducing aerodynamic drag due to freestream airflow 32 thereover during cruise operation of the aircraft and prevent separation at off-cruise operation. However, inasmuch as engine airflow 30 discharged from the fan nozzle 26 primarily flows over the inner cowl 22, the profile of the inner cowl 22 of the NLFN 20 determined according to conventional standards remains unchanged.

Figure 2:
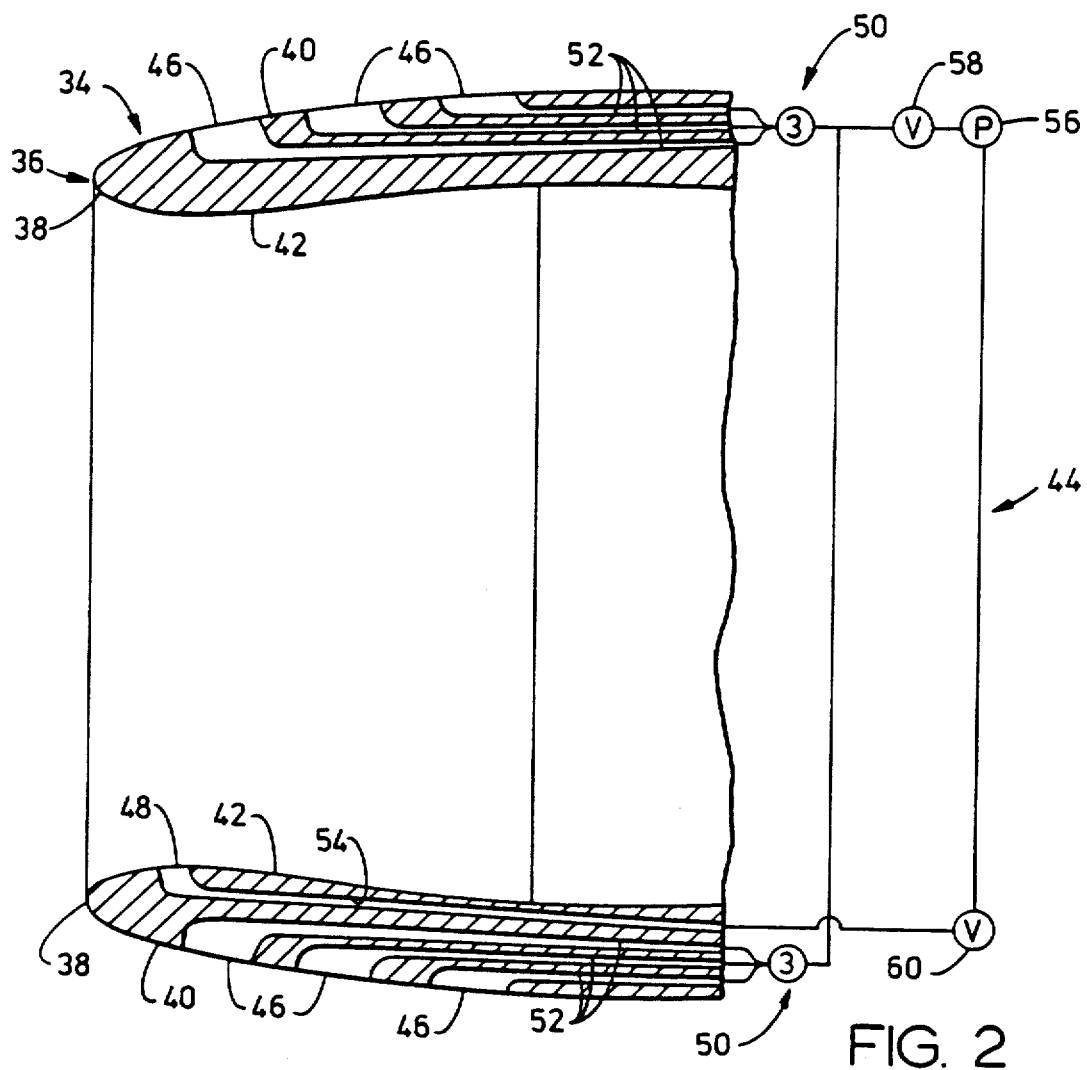
FIG. 2 is a fragmentary longitudinal axial sectional view of a forward portion of the HLFN in accordance with the present invention.

Hybrid Laminar Flow NaCelle F Referring now to FIG. 2, there is illustrated the forward portion of an outer annular cowl 34 of a hybrid laminar flow nacelle (HLFN) 36 in accordance with the present invention.

The outer annular cowl 34 has a leading lip 38 and radially spaced and axially extending annular outer (or external) and inner (or internal) forward surface portions 40, 42 which merge at the leading lip 38. The modifications referred to above incorporated by the HLFN 36 that are effective for reducing aerodynamic drag during cruise operation of the aircraft and preventing separation at off-cruise operation are a suction bleed system 44 and the geometry shape of the leading lip 38 and the annular outer forward surface portion 42 of the outer cowl 34.

Figure 3:
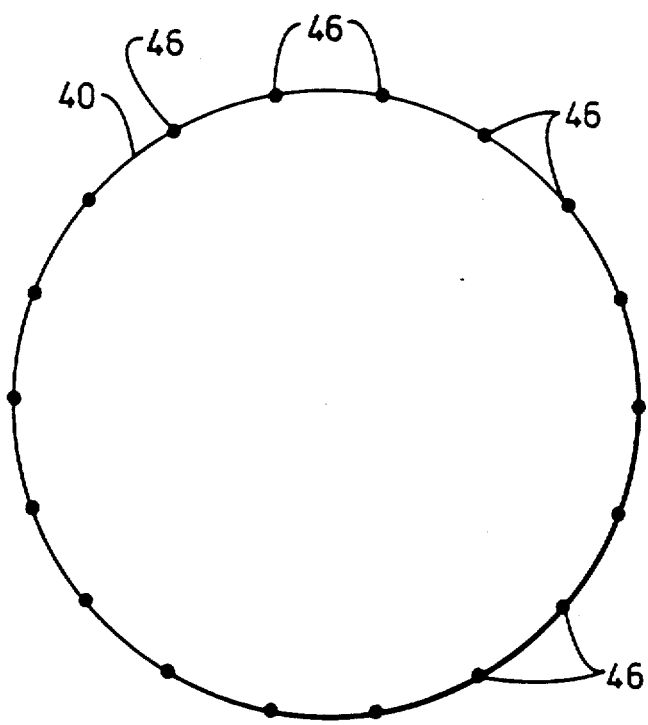
FIG. 3 is a circle representing the external circumference of the HLFN at the location of the forwardmost circumferential row of external air suction ports to illustrate the circumferential spacing of the external ports about the HLFN.
Figure 4:
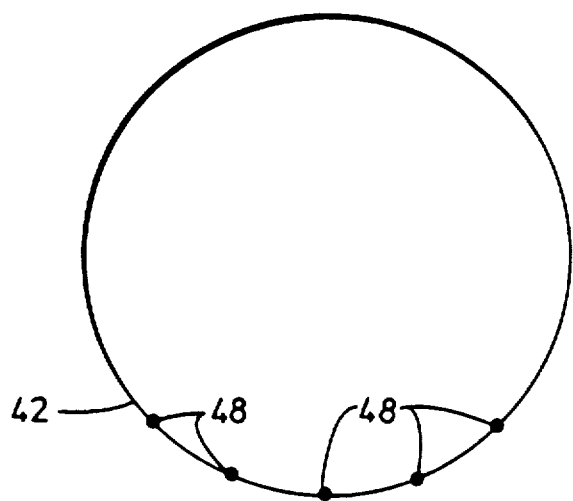
FIG. 4 is a circle representing the internal circumference of the HLFN at the location of the internal air suction ports to illustrate the circumferential spacing of the internal ports about the HLFN.

As seen in FIG. 2, the suction bleed system 44 includes a plurality of air suction elements 46, 48 Preferably in the form of ports, defined in respective outer and inner forward surface portions 40, 42 of the outer cowl 34 of the HLFN 36 and axially downstream from its leading lip 38 in the direction of airflow. The air suction ports 46, 48 can take any suitable form, such as porous wall sections, perforations or slots. As seen in FIGS. 2 and 3, there is preferably more than one row of outer (or external) ports 46 and they are defined in spaced relation to one another about the complete circumference of the outer cowl 34. One the other hand, as seen in FIGS. 2 and 4, there is preferably only one row of inner (or internal) ports 48 and they are defined in spaced relation to one another only about a bottom arcuate segment of the circumference of the outer cowl 34.

The suction bleed system 44 also includes a suction generating means 50 and a plurality of ducts 52, 54 extending through the interior of the outer cowl 34 between the outer and inner surface portions 40, 42 thereof and respectively interconnecting the outer and inner air suction ports 46, 48 and the suction generating means 50 in flow communication. By way of example, as illustrated in FIG. 2, the suction generating means 50 can be composed of a pump 56 and a pair of valves 58, 60 which respectively interconnect the outer and inner suction port ducts 52, 54 with the pump 56.

The valves 58, 60 of the suction generating means 50 are operable for applying air suction via the ducts 52, 54 to selected ones of the air suction ports 46, 48. For example, at cruise operation of the aircraft, the valve 60 would be closed and the valve 58 would be opened to provide communication between one or more of the sets of outer air suction ports 46 to cause bleed of a portion of an outer boundary layer airflow therethrough at the outer surface 40 of the outer cowl 34 for augmenting reduced friction drag laminar flow over the outer cowl. On the other hand, at off-cruise operation of the aircraft, the valve 58 would be closed and the valve 60 would be opened to provide communication between the inner air suction ports 48 to cause bleed of a portion of an inner boundary layer airflow therethrough at the inner surface 42 of the outer cowl 34 for preventing separation over the inner surface 42 of the outer cowl 34. Such bleeding off of a portion of the boundary layer airflow assists in causing and maintaining the boundary layer attachment to the outer and inner surface portions 40, 42 of the airstream as it divides and passes the leading lip 38 of the outer cowl 34 of the HLFN 36.

Turning now to FIGS. 5A-5C, it can be seen that the design of the HLFN 36 of the present invention is a compromise between the forward portion of the blunt-lip conventional nacelle 62 of FIG. 5A and the forward portion of the sharp-lip NLFN 20 of FIG. 5B.

33 Referring to FIGS. 6A-6C, and noting that FIG. 6C is without suction applied to the HLFN 36 of FIG. 5C, it can be understood from the graphs of the Mach numbers and pressure distributions of airflow progressing from the hilite of the nacelles (or forwardmost point on the nacelles) in a downstream direction therealong that the HLFN 36 passively does not quite produce natural laminar flow on its outer surface 40 at cruise as does the NLFN 20 but is substantially better than the turbulent flow produced by the conventional nacelle 62. Further, the HLFN 36 passively does not quite satisfy the off-cruise or low speed requirements as does the blunt-lip conventional nacelle 62 but is substantially better than the NLFN 20.

However, acceptable internal separation-free flow at off-cruise and external low aerodynamic drag laminar flow at cruise operation of the aircraft is achieved in the HLFN 36 by the combined effect of tailored geometry shaping of the nacelle outer surface 40 and use of suction bleed system 44 to provide selected outer and inner boundary layer bleed, as just described. As shown in FIG. 6C, the outer forward surface portion of the outer cowl 34 of the HLFN 36 has a geometry shape tailored to produce a substantially uniform pressure in a boundary layer airflow along the cowl outer surface 40. As seen in FIGS. 5A-5C, the geometry shape of the leading or forward lip 38 of the HLFN 36 is blunter than that of the NLFN 20 but sharper than that of the conventional nacelle 62. Compared to the conventional blunt-lip nacelle 62 which produces turbulent flow at cruise operation of the aircraft and compared to the sharp-lip NFLN 20 which produces separated internal flow at off-cruise operation of the aircraft, the round-lip HLFN 36 and boundary layer bleed through the outer or external surface 40 of the HLFN 36 produce laminar flow at cruise operation of the aircraft and the round-lip HLFN 36 and boundary layer bleed through the inner or internal surface 42 near the lip 38 of the HLFN 36 produce separation-free internal flow at off-cruise (low speed, high angle-of-attack) operation of the aircraft.

The advantages of the HLFN 36 lie in the combination of geometric shape and application of boundary layer bleed which overcomes the difficulties of the NLFN 20 described earlier. The HLFN 36 is less susceptible to early spillage drag at lower than design MFR (mass flow ratio) because the geometric shape of the lip is more like the blunt lip of a conventional nacelle 62 than the sharp lip of the NLFN 20. In addition, the round lip 38 provides the HLFN 36 (without internal lip bleed) with some angle-of-attack capability at low speed whereas the NLFN 20 (without variable geometry) has no capability. The boundary layer bleed on the external surface of the HLFN 36 not only provides laminar flow at the design point, but prevents premature transition at lower than the design MFR. The HLFN 36 bleed system is designed to overcome the slight adverse pressure gradient present at the design MFR, but additional bleed can be applied if the gradient becomes more severe. Finally, since the HLFN 36 does not require as high a Mach number at the maximum diameter, wave drag is likely to be less of a problem than for the NLFN 20.

The disadvantages of the HLFN 36 are the need for an auxiliary power source to drive the bleed pump 56 which increases the parasitic demands of the engine and the additional weight of the bleed system (pump, ducts, etc). The power demand can be kept to a minimum through adjustments to the outer cowl contour to minimize the extent and degree of the adverse pressure gradient and through judicious determination of the location and extent of the suction regions over the fan cowl. The additional weight is characteristic of both the HLFN 36 and NLFN 20, requiring optimization.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. A hybrid laminar flow nacelle for housing an engine of an aircraft, comprising:
   (a) an outer annular cowl having a leading lip and radially spaced and axially extending annular outer and inner forward surface portions which merge at said leading lip; and
   (b) a suction bleed system including a plurality of air suction elements defined in said outer and inner forward surface portions axially downstream from said leading lip in the direction of airflow, suction generating means, and means interconnecting said air suction elements and suction generating means in flow communication;
   (c) said suction generating means being operable for applying air suction selectively to said air suction elements to cause bleed of portions of a boundary layer airflow through said air suction elements at said outer surface of said cowl for augmenting reduced friction drag laminar flow over said cowl at cruise operation of the aircraft and to cause bleed of portions of a boundary layer airflow through said air suction elements at said inner surface of said cowl for preventing separation over said inner surface of said cowl at off-cruise operation of the aircraft.

2. The hybrid nacelle as recited in claim 1, wherein said air suction elements in said outer surface include more than one row of outer ports, said rows being defined in axially spaced relation to one another and said ports in each row being defined in spaced relation about a complete circumference of said outer surface.

3. The hybrid nacelle as recited in claim 1, wherein said air suction elements in said inner surface include a row of inner ports, said ports in said row being defined in spaced relation to one another only about a bottom arcuate segment a circumference of said inner surface.

4. The hybrid nacelle as recited in claim 1, wherein said means :rnterconnecting said air suction elements and suction generating means in flow communication includes a plurality of ducts extending through an interior of said outer cowl between said outer and inner surface portions thereof and respectively interconnecting said outer and inner air suction elements and said suction generating means.

5. The hybrid nacelle as recited in claim 4, wherein said suction generating means is composed of a pump and a pair of valves respectively interconnecting said outer and inner suction port ducts with said pump.

6. The hybrid nacelle as recited in claim 5, wherein said valves are operable for applying air suction via said ducts to selected ones of said air suction ports to provide communication between one or more of said air suction ports to cause said bleed of boundary layer airflow portions therethrough for preventing separation over said outer cowl.

7. The hybrid nacelle as recited in claim 1, wherein said leading lip of said outer cowl has a rounded surface shape.

8. The hybrid nacelle as recited in claim 1, wherein said outer forward surface portion of said cowl has a geometry shape tailored to produce a substantially uniform pressure in said boundary layer airflow along said outer forward surface portion.

9. A hybrid laminar flow nacelle for housing an engine of an aircraft, comprising:
   (a) an outer annular cowl having a leading lip and radially spaced and axially extending annular outer and inner forward surface portions which merge at said leading lip; and
   (b) a suction bleed system including a plurality of air suction elements defined in said outer and inner forward surface portions axially downstream from said leading lip in a direction of airflow, suction generating means, and means interconnecting said air suction elements and suction generating means in flow communication;
   (c) said outer forward surface portion of said cowl having a geometry shape tailored to produce a substantially uniform pressure in a boundary layer airflow along said surface;
   (d) said suction generating means being operable for applying air suction selectively to said air suction elements to cause bleed of portions of said boundary layer airflow through said air suction elements at said outer surface of said cowl for augmenting reduced friction drag laminar flow over said cowl at cruise operation of the aircraft and to cause bleed of portions of said boundary layer airflow through said air suction elements at said inner surface of said cowl for preventing separation over said inner surface of said cowl at off-cruise operation of the aircraft.

10. The hybrid nacelle as recited in claim 9, wherein said air suction elements in said outer surface are in the form of more than one row of outer ports, said rows being defined in axially spaced relation to one another and said ports in each row being defined in spaced relation about a complete circumference of said outer surface.

11. The hybrid nacelle as recited in claim 9, wherein said air suction elements in said inner surface are in the form of a row of inner ports, said ports in said row being defined in spaced relation to one another only about a bottom arcuate segment of a circumference of said inner surface.

12. The hybrid nacelle as recited in claim 9, wherein said means interconnecting said air suction elements and suction generating means in flow communication includes a plurality of ducts extending through an interior of said outer cowl between said outer and inner surface portions thereof and respectively interconnecting said outer and inner air suction elements and said suction generating means.

13. The hybrid nacelle as recited in claim 12, wherein said suction generating means is composed of a pump and a pair of valves respectively interconnecting said outer and inner suction port ducts with said pump.

14. The hybrid nacelle as recited in claim 13, wherein said valves are operable for applying air suction via said ducts to selected ones of said air suction ports to provide communication between at least one of said air suction ports to cause said bleed of boundary layer airflow portions therethrough for augmenting reduced friction drag laminar flow over said outer cowl.

15. The hybrid nacelle as recited in claim 9, wherein said leading lip of said outer cowl has a rounded surface shape.

16. A hybrid laminar flow nacelle for housing an engine of an aircraft, comprising:
  (a) an outer annular cowl having a leading lip and radially spaced and axilaly extending annular outer and inner forward surface portions which merge at said leading lip; and
  (b) a suction bleed system including a plurality of air suction elements defined in said outer forward surface portion axially downstream from said leading lip in a direction of airflow, suction generating means, and means interconnecting said air suction elements and suction generating means in flow communication;
  (c) said suction generating means being operable for applying air suction to said air suction elements to cause bleed of portions of a boundary layer airflow through said air suction elements at said outer surface of said cowl for augmenting reduced friction drag laminar flow over said cowl at cruise operation of the aircraft.

17. The hybrid nacelle as recited in claim 16, wherein said air suction elements in said outer surface include more than one row of outer ports, said rows being defined in axially spaced relation to one another and said ports in each row being defined in spaced relation about a complete circumference of said outer surface.

18. THe hybrid nacelle as recited in claim 16, wherein said means interconnecting said air suction elements and suction generating means in flow communication includes a plurality of ducts extending through an interior of said outer cowl between said outer and inner surface portions thereof and interconnecting said outer air suction elements and said suction generating means.

19. The hybrid nacelle as recited in claim 18, wherein said suction generating means is composed of a pump and at least one valve interconnecting said outer suction port ducts with said pump.

20. The hybrid nacelle as recited in claim 19, wherein said valve is operable for applying air suction via said ducts to selected ones of said air suction ports to provide communication between at least one of said air suction ports to cause said bleed of boundary layer airflow portions therethrough for preventing separation over said outer cowl.

21. The hybrid nacelle as recited in claim 16, wherein said leading lip of said outer cowl has a rounded surface shape.

22. The hybrid nacelle as recited in claim 16, wherein said outer forward surface portion of said cowl has a geometry shape tailored to produce a substantially uniform pressure in said boundary layer airflow along said surface.

* * * * *